Figure 1:
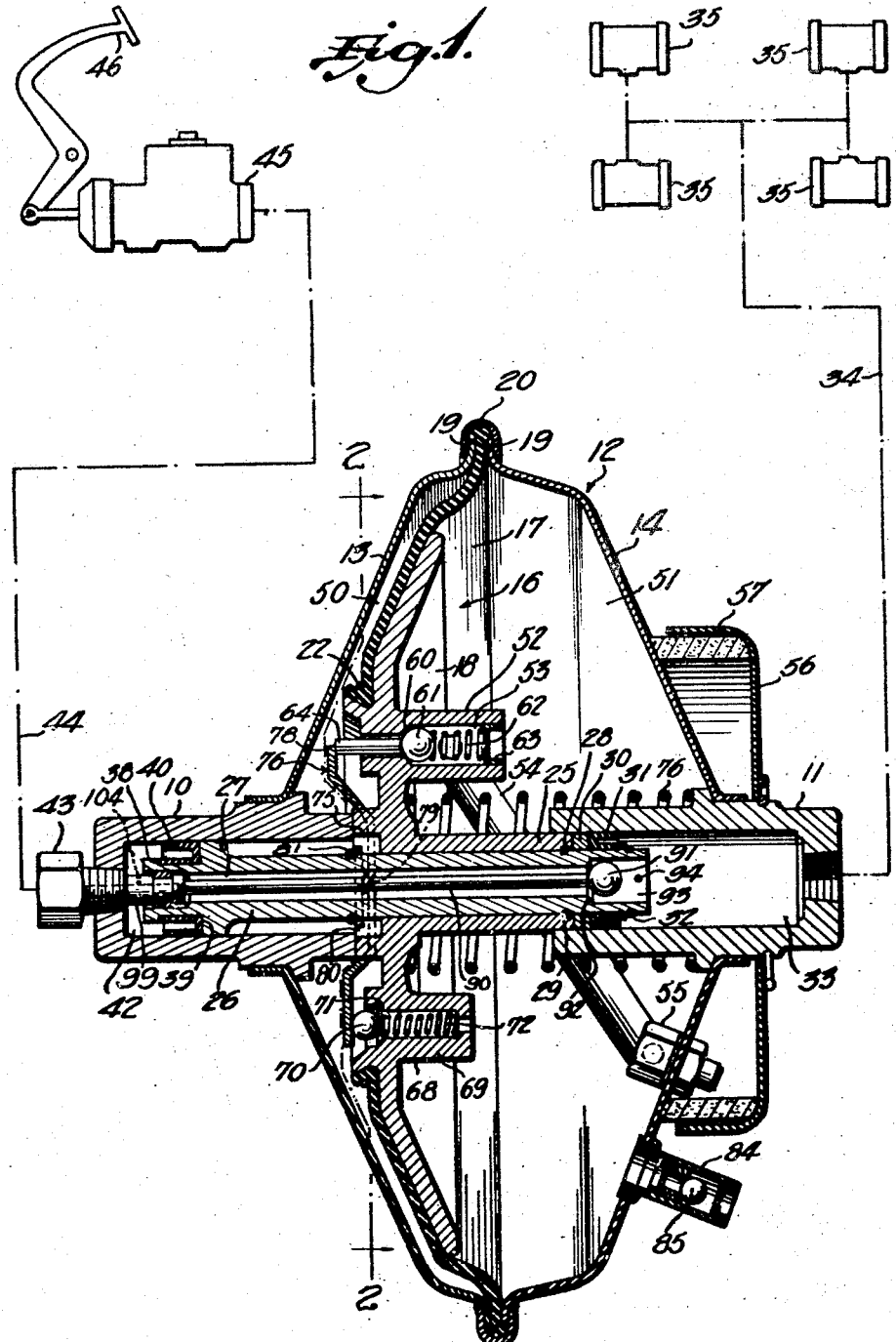

Nov. 19, 1946.   W. F. PENROSE   2,411,458
BOOSTER BRAKE MECHANISM
Filed July 31, 1944   2 Sheets-Sheet 2

INVENTOR
WILLIAM F. PENROSE
ATTORNEY

Patented Nov. 19, 1946

2,411,458

UNITED STATES PATENT OFFICE 2,411,458

BOOSTER BRAKE MECHANISM

William F. Penrose, Newark, N. J., assignor to Empire Electric Brake Company, Newark, N. J., a corporation of New Jersey Application July 31, 1944, Serial No. 547,363

12 Claims. (Cl. 60—54.5)

This invention relates to power brake mechanisms, and more particularly to a booster hydraulic brake mechanism of the type shown in the copending application of Rudolph J. Klimkiewicz, Serial No. 504,451, filed September 30, 1943, now Patent No. 2,377,699.

Booster brake mechanisms of the type referred to have been developed for assisting in the application of braking pressures to the hydraulically operated wheels of a motor vehicle. Devices of this character generally utilize fluid displaced from the master cylinder for taking up play between the brake shoes and brake drums, after which pressure is built up in the system to actuate a motor to boost the pressure applied to the brakes. Generally, the pressure developed in the master cylinder is added to the motor-developed pressure to produce a resultant braking pressure substantially higher than that developed in the master cylinder. Such mechanisms employ means for providing for a direct flow of brake fluid from the master cylinder to take up play between the brake shoes and the brake drums, and such means is closed to disconnect the master cylinder from the brake cylinders upon actuation of the motor or upon actuation of the manually operated piston which controls actuation of the motor.

In such a mechanism the passage or other means which provides for the flow of fluid from the master cylinder direct to the brake cylinders ordinarily provides for a relatively unrestricted flow of brake fluid. However, a rapid operation of the master cylinder can, and frequently does, operate the manually controlled piston to actuate the booster motor and to close direct communication between the master cylinder and the brake cylinders before play has been taken up between the brake shoes and brake drums. To take care of such a situation it is necessary that the high pressure cylinder used in such a mechanism be of such length as to permit displacement from the high pressure cylinder of the fluid necessary to both engage the shoes with the brake drums and to effect the maximum braking force in the event direct communication from the master cylinder and the brake cylinders is cut off prior to engagement of the brake shoes with the drums.

An important object of the present invention is to provide novel means for preventing substantial operation of the manually operable motor-controlled piston until all, or substantially all, of the fluid necessary for engagement of the brake shoes with the brake drums has flowed from the master cylinder to the brake cylinders, thus permitting the use of a shorter pressure cylinder construction in the booster.

More specifically, an important object of the invention is to provide a novel fluid control means for insuring more positive flow of fluid directly from the master cylinder to the wheel cylinders than can take place from the chamber in which fluid pressure acts to move the manually operable piston, thus insuring against substantial movement of such piston until a relatively great volume of fluid has flowed from the master cylinder to the wheel cylinders to take up play between the brake shoes and the brake drums.

Other objects and advantages of the invention will become apparent during the course of the following description.

In the drawings I have shown on embodiment of the invention. In this showing—

Figure 2:
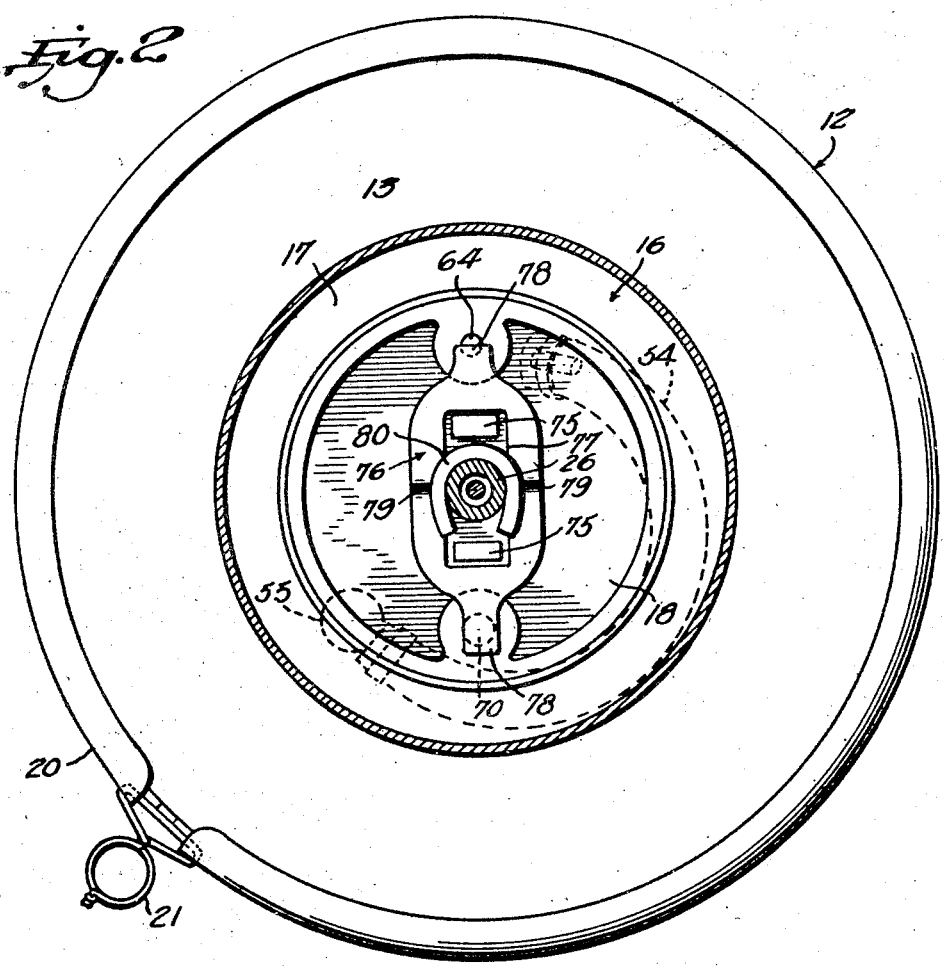
Figure 3:
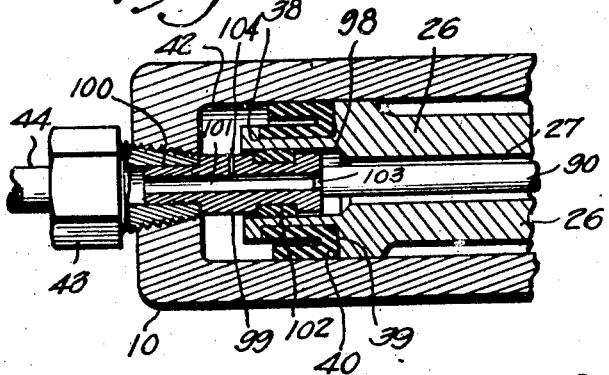
Figure 4:
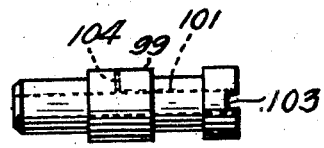

Figure 1 is an axial sectional view through the booster brake mechanism, the master cylinder and the brake cylinders together with their connections with the booster brake mechanism being diagrammatically represented, Figure 2 is a transverse sectional view taken substantially on line 2—2 of Figure 1, Figure 3 is an enlarged fragmentary axial sectional view showing the low pressure cylinder and the flow control device associated therewith, and Figure 4 is an enlarged side elevation of the flow control valve.

Referring to Figure 1, the numerals 10 and 11 respectively indicate alined high and low pressure cylinders of a booster mechanism between which is arranged a booster motor indicated as a whole by the numeral 12. This motor is preferably of the differential fluid pressure operated type and comprises casing sections 13 and 14 of generally conical shape secured at their ends to the respective cylinders 10 and 11. A pressure movable unit indicated as a whole by the numeral 16 is arranged in the motor and comprises a flexible diaphragm 17 and a diaphragm 18, the peripheral portion of the diaphragm being arranged between the adjacent flanges 19 of the motor casing sections and clamped in position by a split band 20, the ends of which may be secured together in any suitable manner, for example, by a wire 21 (Figure 2). The diaphragm 17 is secured to the plate 18 by a snap ring or encircling wire 22 (Figure 1).

The diaphragm plate 18 is provided with an axial cylindrical piston 25 in which is slidably arranged a manually operable piston 26 having a bore 27 therethrough for a purpose to be described. A snap ring 28 is arranged on the piston 26 and is slidable into a recess 29 formed in the end of the piston 25. A ring 30 is arranged against the adjacent end of the piston 25 and engages a double-lipped packing cup 31 retained around the adjacent end of the piston 26 by a snap ring 32. The pistons 25 and 26 are movable toward the right in Figure 1 to build up pressure in and displace fluid from the high pressure chamber 33 in the cylinder 11. Such chamber is connected by suitable lines 34 to the wheel cylinders 35 of the vehicle.

The left hand end of the piston 26 is grooved as at 38 and the inner end of such groove terminates in a shoulder 39. A double-lipped packing cup 40 is arranged in the groove 38 against the shoulder 39. The left hand end of the cylinder 10 forms a low or primary pressure chamber 42 in which is threaded a union 43, and a line 44 connects this union to a master cylinder 45 having a conventional piston (not shown) therein operated by a brake pedal 46.

Valve means are provided for controlling pressures formed in the chambers 50 and 51 in the motor on opposite sides of the pressure responsive unit. The diaphragm plate 18 (Figure 1) carries a preferably integral cylindrical extension 52 having a chamber 53 therein communicating with one end of a pressure hose or other conduit 54, this hose being connected to a source of atmospheric or super-atmospheric pressure depending upon whether the motor is to be vacuum or pressure operated. In the present instance, the conduit 54 leads to a connection 55 communicating with the atmosphere externally of the motor casing section 14, such space preferably being covered by a shell 56 housing a suitable air cleaner 57.

The tubular extension 52 is provided internally thereof with a valve seat 60 shown in the present instance as being engaged by a ball valve 61 urged to closed position by a spring 62, one end of such spring engaging the ball 61 and the other end engaging a spring seat 63 which closes the adjacent end of the extension 52 to communication with the motor chamber 51. The ball 61 is adapted to be unseated by a stem 64 operated in a manner to be described.

A second tubular extension 68 is preferably formed integral with the diaphragm plate 18 and has its interior communicating with the motor chamber 51 through a port 69. A valve, shown as a ball 70, is engageable with a seat 71 to control communication between the motor chambers 50 and 51, this valve being urged from its seat by a spring 72 of lower tension than the spring 62 for a purpose to be described.

The diaphragm plate 18 is provided with lugs 75 engageable with the adjacent end of the cylinder 10 to limit movement of the pressure movable unit to the left as viewed in Figure 1, and a compression spring 76 urges the pressure responsive unit in such direction. The lugs 75 and the piston 26 are straddled by a lever 76, this lever being provided with an opening 77 through which extend the lugs 75 and the piston 26. One end 78 of the lever is directly engageable with the ball 70. Centrally of its length the opposite sides of the lever are preferably stamped to provide bulged points 79 engageable with a yoke 80 snapped around the piston 26 and fixed against movement to the left relative thereto by a snap ring 81 (Figure 1).

The lever 76 controls the movement of the valves 61 and 70, the former valve controlling the admission of air as stated while the valve 70 controls communication between the motor chambers 50 and 51. The latter chamber is in constant communication with a source of lower pressure, for example, the intake manifold of the vehicle engine. For this purpose, a nipple 84 is connected to the motor casing section 14 to communicate therewith and has its opposite end suitably connected by a pipe (not shown) to the intake manifold of the motor vehicle engine. The nipple 84 is provided with a check valve 85 to prevent sudden increases in pressure in the motor chamber 51.

In such prior constructions as that shown in the said Patent No. 2,377,699 to Klimkiewicz, fluid displaced from the master cylinder operates a piston such as the piston 26 to operate a valve lever, such as the lever 76, to energize the motor and thus utilize the power thereof for assisting the manually operated pistons for generating pressure in the high pressure side of the system leading to the brake cylinders. Before such motor actuation takes place, it is highly desirable that fluid from the master cylinder first flow through the bore 27 to operate the brake cylinders 35 to engage the brake shoes with the drums. Such operation of the brake cylinders requires the movement of a far greater quantity of fluid than is moved or displaced after initial engagement of the brake shoes takes place. After the latter point in the operation of the mechanism is reached, pressure will be built up in the system and the area of the left hand end of the piston 26 in the present construction being greater than the area of the right hand end thereof, the piston 26 will then move to the right to effect motor operation. The power operation then occurring requires the closing of the bore 27. For this purpose, a rod 90 extends through the bore 27 to engage a ball 91 engageable with a seat 92 formed at the inner end of an enlarged bore 93 at the right hand end of the piston 26 in Figure 1, movement of the ball out of the bore 93 being prevented by a pin 94. In a manner to be described, the rod 90 when the parts of the apparatus are in the "off" position shown in Figure 1 occupies the position holding the valve 91 off its seat, and the space around the rod 90 and around the ball 91 when the latter is unseated is such as to provide for the substantially unrestricted flow of fluid from the master cylinder through the bore 27 into the chamber 33 to displace therefrom sufficient fluid to engage the brake shoes with the brake drums.

In prior constructions, the sudden rapid depression of the brake pedal can displace fluid from the master cylinder at a rate greater than such fluid can flow directly through the apparatus into the brake cylinders, thus building up in the chamber 42 a false pressure sufficient to operate the piston 26 to energize the motor 12 before the brake shoes are initially engaged with the brake drums by fluid flowing through the passage 27, chamber 33 and brake lines 34. This false operation is due to the fluid friction of the elements through which fluid flows to the brake cylinders, and to the inertia of the brake shoes against sudden movements. The present device prevents such operation. Referring to Figure 3, the end of the piston 26 is provided with a bore 98 larger than and communicating with the bore 27 into which extends a control device 99 pressed as at 100 into the adjacent end of the union 43 and having a bore 101 extending therethrough.

A rubber or similar packing ring 102 is carried by the control device 99 for sliding engagement in the bore 98. The inner end of the device 99 is provided with a slot 103 to facilitate flow of fluid past the adjacent end of the rod 90. The end of the piston 26 in Figure 3 is spaced from the adjacent end of the chamber 42 and in this space the device 99 is provided with a relatively restricted metering port 104 affording limited communication between the bore 101 and the chamber 42 when the parts of the apparatus are in the "off" position. The rod 90 is engaged against the adjacent end of the device 99 when the parts are in the position referred to to hold the ball 91 off its seat. Contact between the rod 90 and the device 99 is established when the brake parts reach the fully released position, and when the brakes are applied, brake fluid flowing through the bore 101 readily moves the end of the rod 90 toward the right as viewed in Figure 3 for the free flow of fluid from the bore 101 into the bore 27.

The operation of the mechanism is as follows:

Assuming that the brakes are completely released with the parts in the positions shown in the drawings, brake application will take place upon operation of the pedal 46. Such operation displaces fluid from the master cylinder 45 through the line 44, bore 101 (Fig. 3) and bore 27 into the high pressure chamber 33 (Fig. 1) to displace fluid therefrom to move the brake shoes into engagement with the brake drums. The flow of fluid referred to is relatively unrestricted, whereas there is substantial restriction in the flow of fluid through the metering port 104 (Fig. 3). The flow of fluid thus displaced from the master cylinder will result in a positive flow of a much greater volume of fluid through the bore 27 than through the port 104, the latter flow being insufficient to cause rapid movement of the piston 26. The flow of fluid through port 104 will result in very slow movement of the piston 26 through which motor energization is effected. The relatively unrestricted flow of fluid through bore 27 causes positive engagement of the brake shoes with the brake drums before substantial operation of the piston 26 occurs, and consequently before any substantial operation of the motor 12 takes place, the latter operation being referred to below.

Whether any motor energization takes place prior to initial engagement of the brake shoes with the brake drums depends upon the rate of displacement of fluid from the master cylinder 45. Assuming that the flow capacity of the bore 27 is sufficient under a given operating condition to engage the brake shoes with the drums prior to motor energization, contact of the shoes with the drums will be immediately followed by an increase in pressure in the entire hydraulic system. The pressure increase will result in a more rapid flow of fluid through the port 104 which will be followed by a more rapid movement of the piston 26.

Any substantial movement of the piston 26 from its normal or "off" position will result in operating the valve mechanism to energize the motor 12. The engagement of the member 80 (Figures 1 and 2) with the points 79 of the lever 76 will tend to cause bodily movement of this lever toward the right. The spring 62 being of greater tension than the relatively weak spring 72, the lever 76 will fulcrum at its point of engagement with the pin 64 and the lower end of the lever will seat the valve 70. Very little movement of the lever 76 is required for this operation since the lower end of the lever will move twice the distance of the piston 26.

Prior to the operation referred to the motor 12 will be "vacuum suspended," that is, balanced subatmospheric pressures will exist in the motor chambers 50 and 51. The seating of the valve 70 closes communication between the motor chambers, and since the lower end of the lever will be fixed against further movement toward the right, continued slight movement of the piston 26 will move the upper end of the lever 76 to unseat the ball 61, thus permitting air to flow past the valve 61 into the motor chamber 50. The higher pressure thus established in the motor chamber 50 will effect movement of the pressure movable unit 16 toward the right to similarly move the piston 25. If the movement of the piston 26 stops, a very slight additional movement of the pressure movable unit 16 will release the pressure of the upper end of the lever from the pin 64 and the motor operation also will stop. Any tendency for the pressure movable unit to move too far will result in "cracking" the vacuum valve 70 to exhaust some of the air from the motor chamber 50 to establish the proper differential motor pressures to arrest operation of the motor. It will be obvious that the pressure movable unit 16 partakes of a follow-up action with respect to the piston 26.

It will be apparent that movement of the piston 26 toward the right through a relatively short distance will carry the valve seat 92 into engagement with the ball 91, the rod 27 thus becoming ineffective for holding the ball 91 off its seat. The chamber 33 thus will be disconnected from the chamber 42, and movement of the pistons 25 and 26 will displace fluid from the chamber 33 into the brake lines to provide the necessary braking pressures, these pressures being built up partly by manual operation of the piston 26 and partly by power operation of the piston 25. The operator thus performs part of the work in building up the braking pressures and the foot pedal 46 is always subjected to reaction pressures exactly proportional to the braking pressures.

Assuming that the movement of fluid through the line 44 at the beginning of the brake operation will have taken place incident to a very rapid brake pedal operation, the flow of fluid through the port 104 may result in sufficient movement of the piston 26 to cause energization of the motor. However, the movement of the piston 26 necessarily will be relatively slow, and the packing 102 is arranged a sufficient distance from the left hand extremity of the piston 26 to insure motor operation at a very slow rate to insure the taking up of play between the brake shoes and drums prior to the point at which the left hand extremity of the piston 26 passes the packing 102. From this point on, the bore 101 will provide for the relatively unrestricted flow of fluid into the chamber 42. By this time, however, the brake shoes will have been definitely brought into engagement with the brake drums.

When the foot pedal 46 is released, pressure will drop in the chamber 42 and the pressure acting against the opposite end of the piston 26 will move this piston toward the left (Fig. 1) to release the pressure exerted against the valves 61 and 70. The closing of the valve 61 will cut off the chamber 50 from the atmosphere and the opening of the valve 70 will connect the chambers 50 and 51 for the exhaustion of air from the chamber 50. The spring 76 will return the parts to their normal positions, and when the rod 90 engages the device 99, the ball 91 will be unseated to reestablish the communication between the line 44 and the brake cylinders. The unseating of the valve 91 when the parts are in the normal or "off" positions provides for the flow of fluid through the bore 27 when brake pedal operation is initiated, as stated. The unseating of the ball 91 also permits the replenishing in the high pressure side of the system of any leakage of brake fluid which may have occurred, and the usual valve (not shown) at the outlet of the master cylinder 45 will maintain the usual residual pressure throughout the system.

It will be apparent that the use of the mechanism shown in Fig. 3 positively limits the flow of fluid into the chamber 42 to thus limit motor-energizing operation of the piston 26 until the brake shoes have been engaged with the drums. Without such means, sudden rapid brake pedal operation may result in the relatively excessive flow of fluid into the chamber 42 thus building up a false pressure therein. Such false pressure in the chamber 42 would cause a motor-energizing movement of the piston 26 and such movement of this piston not only will energize the motor but will result in the closing of the valve 91 before the brake shoes have been engaged with the drums. Under such conditions, all of the remaining fluid necessary for initial engagement of the brake shoes would have to be supplied solely from the chamber 33 and this could take place only by movement of the pistons 25 and 26. Unless the high pressure cylinders of prior devices are made relatively long, therefore, it is possible for the piston elements moving into the high pressure chamber to reach their limits of movement prior to a full brake application. To insure the proper operation of such a mechanism under all conditions, therefore, it is necessary as a practical matter to make the pressure cylinders, corresponding to the cylinder 11, relatively long. Such construction obviously is not necessary in the present device. Therefore, the present device permits the shortening and compacting of the mechanism and further insures the performance of the intended booster operation of the apparatus.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a booster mechanism for a hydraulic vehicle brake system having wheel cylinders to apply the brakes and a pedal-controlled master cylinder, a booster unit comprising a low pressure cylinder adapted to communicate with the master cylinder, a high pressure cylinder adapted to communicate with the wheel cylinders, a motor having a movable unit including a member projecting into said high pressure cylinder to displace fluid into said wheel cylinders upon energization of said motor, a pressure responsive member in said low pressure cylinder operable by fluid displaced from the master cylinder, means operable by said pressure responsive member for energizing said motor, said booster unit being constructed to provide for the substantially unrestricted flow of fluid from the master cylinder to said high pressure cylinder when said pressure responsive member is in its "off" position, means for preventing such flow of fluid after said pressure responsive member has moved a predetermined distance and the pressure in said high pressure cylinder is higher than the pressure in said low pressure cylinder, and means co-operating with said pressure responsive member and dependent thereon when the latter is in its "off" position for limiting the flow of fluid from the master cylinder into said low pressure cylinder relative to the flow of fluid from the master cylinder to said high pressure cylinder when the master cylinder is initially actuated.

2. In a booster mechanism for a hydraulic vehicle brake system having wheel cylinders to apply the brakes and a pedal-controlled master cylinder, a booster unit comprising a low pressure cylinder adapted to communicate with the master cylinder, a high pressure cylinder adapted to communicate with the wheel cylinders, a motor having a movable unit including a member projecting into said high pressure cylinder to displace fluid into said wheel cylinders upon energization of said motor, a pressure responsive member in said low pressure cylinder operable by fluid displaced from the master cylinder, means operable by said pressure responsive member for energizing said motor, said booster unit being constructed to provide for the substantially unrestricted flow of fluid from the master cylinder to said high pressure cylinder when said pressure responsive member is in its "off" position, means for preventing such flow of fluid after said pressure responsive member has moved a predetermined distance and the pressure in said high pressure cylinder is higher than the pressure in said low pressure cylinder, and a device mounted in said low pressure cylinder and communicating with the master cylinder, such device having a port communicating at all times with said low pressure cylinder and of such cross sectional area as to positively limit the flow of fluid from the master cylinder into said low pressure cylinder relative to the flow of fluid from the master cylinder to said high pressure cylinder when said pressure responsive member is in its "off" position, said device having a passage normally closed to said low pressure cylinder by said pressure responsive member when the latter is in its "off" position and opened to said low pressure cylinder by movement of said pressure responsive member from its "off" position.

3. In a booster mechanism for a hydraulic vehicle brake system having wheel cylinders to apply the brakes and a pedal-controlled master cylinder, a booster unit comprising a low pressure cylinder and a high pressure cylinder arranged in axial alinement and adapted to communicate respectively with the master cylinder and with the wheel cylinders, a differential fluid pressure motor having a pressure responsive unit and a member carried thereby and projecting into said high pressure cylinder to displace fluid therefrom upon energization of said motor, a piston in said low pressure cylinder movable by fluid displaced from the master cylinder, a valve mechanism operable by said piston for energizing said motor, said booster unit being constructed and arranged to utilize the pressure generated in the master cylinder for assisting said motor in generating pressures in said high pressure cylinder, and being further constructed and arranged to provide for the substantially unrestricted flow of fluid from the master cylinder, and to said high pressure cylinder when said piston is in its "off"

position, means for preventing the flow of fluid from the master cylinder to the high pressure cylinder after said piston has moved a predetermined distance from its "off" position and when pressure in said high pressure cylinder is higher than in said low pressure cylinder, and metering means co-operating with said piston and dependent thereon when the latter is in its "off" position for positively restricting the flow of fluid from the master cylinder to said low pressure cylinder when said master cylinder is initially actuated.

4. Apparatus constructed in accordance with claim 3 wherein said metering means comprises a metering device mounted in said low pressure chamber, such metering device having a bore therethrough communicating with the master cylinder and through which passes the fluid which flows from a master cylinder to said high pressure cylinder, said metering device having a relatively restricted passage communicatying at all times between said bore and said low pressure cylinder.

5. In a booster mechanism for a hydraulic vehicle brake system having wheel cylinders for applying the brakes and a pedal-controlled master cylinder, a booster unit comprising a low pressure cylinder and a high pressure cylinder arranged in axial alinement and communicating respectively with the master cylinder and with the wheel cylinders, a differential fluid pressure motor having a pressure responsive unit, a fluid displacing piston carried by said unit and projecting into said high pressure chamber to displace fluid therefrom upon energization of said motor, a control piston having one end arranged in said low pressure cylinder and its opposite end projecting through said fluid displacing piston to displace fluid from said high pressure chamber, a follow-up control valve mechanism for said motor operable by said control piston and by said pressure responsive unit, said control piston having a bore therethrough to provide for the substantially unrestricted flow of fluid from the master cylinder to said high pressure cylinder, means for closing said bore upon a predetermined movement of said control piston from its "off" position and when the pressure in said high pressure cylinder is higher than in said low pressure cylinder, and a metering device for limiting the flow of fluid into said low pressure cylinder relative to the flow of fluid through said bore when the master cylinder is initially actuated.

6. Apparatus constructed in accordance with claim 5 wherein said metering device comprises a stationary member mounted in said low pressure cylinder and having a bore therethrough directly communicating with the bore in said control piston to supply fluid thereto directly from the master cylinder, said metering device projecting into the adjacent end of said control piston when the latter is in its "off" position and being provided with a relatively restricted port communicating at all times with said low pressure chamber, the cross sectional area of said port being smaller than the cross sectional areas of the bore of said control piston and said metering device.

7. A hydraulic booster unit comprising a low pressure chamber adapted for connection with a hydraulic fluid displacing device, a high pressure chamber adapted for connection with a device to be hydraulically operated, a motor having a fluid displacing element movable into said high pressure chamber to displace fluid therefrom upon energization of said motor, a pressure responsive device movable by fluid entering said low pressure chamber, said booster mechanism being constructed and arranged to provide for relatively unrestricted flow of fluid from the fluid displacing device to said high pressure chamber when said pressure responsive device is in its "off" position, means operative for stopping said flow of fluid after said pressure responsive device has been moved and pressure in said high pressure chamber is higher than in said low pressure chamber, and means co-operating with said pressure responsive device and dependent thereon when the latter is in its "off" position for positively limiting the flow of fluid from the fluid displacing device into said low pressure chamber relative to said flow of fluid to said high pressure chamber when said fluid displacing device is initially actuated.

8. A hydraulic booster unit comprising a low pressure chamber adapted for connection with a hydraulic fluid displacing device, a high pressure chamber adapted for connection with a device to be hydraulically operated, a motor having a fluid displacing element movable into said high pressure chamber to displace fluid therefrom upon energization of said motor, a pressure responsive device movable by fluid entering said low pressure chamber, said booster mechanism being constructed and arranged to provide for relatively unrestricted flow of fluid from the fluid displacing device to said high pressure chamber when said pressure responsive device is in its "off" position, means operative for closing communication between the fluid displacing device and said high pressure chamber after said pressure responsive device has been moved and pressure in said high pressure chamber is higher than in said low pressure chamber, and a device projecting into proximity to said pressure responsive device when the latter is in its "off" position and dependent thereon for positively limiting the flow of fluid into said low pressure chamber relative to said flow of fluid into said high pressure chamber when said fluid displacing device is actuated.

9. A hydraulic pressure booster mechanism comprising a low pressure chamber and a high pressure chamber in axial alinement and adapted for communication respectively with a hydraulic fluid displacing device and a device to be actuated by hydraulic fluid, a differential fluid pressure motor having a pressure responsive structure including a member projecting into said high pressure chamber to displace fluid therefrom, a pressure responsive member movable by fluid entering said low pressure chamber, a control valve mechanism operable by said pressure responsive member to energize said motor, said pressure responsive member extending through said fluid displacing member into said high pressure chamber to displace fluid therefrom and being provided throughout its length with a bore providing for substantially unrestricted flow of fluid therethrough into said high pressure chamber, means for closing said bore upon a predetermined movement of said pressure responsive member when pressure is higher in said high pressure chamber than in said low pressure chamber, and means for restricting the flow of fluid from said pressure displacing device into said low pressure chamber relative to the flow of fluid through said bore when said fluid displacing device is initially actuated.

10. Apparatus constructed in accordance with claim 9 wherein said last named means comprises a device mounted in said low pressure chamber and projecting into the adjacent end of said bore, such device being provided with a substantially unrestricted passage communicating between said fluid displacing device and said bore, and with a relatively restricted port communicting at all times between said passage and said low pressure chamber.

11. In a booster mechanism for a hydraulic vehicle brake system having wheel cylinders for applying the brakes and a pedal-controlled master cylinder, a booster unit comprising a low pressure cylinder and a high pressure cylinder arranged in axial alinement and adapted to communicate respectively with the master cylinder and with the wheel cylinders, a differential fluid pressure motor having a pressure responsive unit, a tubular piston connected to such unit and projecting into said high pressure chamber to displace fluid therefrom upon energization of said motor, a control piston having one end arranged in said low pressure cylinder and its opposite end projecting through said tubular piston to displace fluid from said high pressure chamber, a follow-up control valve mechanism for said motor operable by said control piston and by said pressure responsive unit, said control piston having an axial bore therethrough for the unrestricted flow of fluid to said high pressure cylinder, a check valve for said bore seating away from said high pressure cylinder, a rod in said bore, a metering device arranged in said low pressure cylinder and having an axial passage communicating with the master cylinder, one end of such device extending into one end of said bore to deliver fluid directly from said passage to said bore, said metering device having a relatively restricted port in constant communication between said passage and said low pressure cylinder, one end of said rod being engageable with said metering device to unseat said check valve when said control piston is in its "off" position.

12. Apparatus constructed in accordance with claim 11 wherein the end of said bore in which said end of said metering device projects is of larger diameter than said metering device, and wherein a sealing ring is interposed between said metering device and the enlarged end of said bore to prevent the flow of fluid from said passage through the enlarged end of said bore into said low pressure cylinder until said control piston has moved a predetermined distance from its "off" position.

WILLIAM F. PENROSE.